(12) United States Patent
Li et al.

(10) Patent No.: US 12,158,345 B2
(45) Date of Patent: Dec. 3, 2024

(54) METHOD FOR ESTIMATING THE POSITION OF A VEHICLE ON A MAP

(71) Applicant: RENAULT s.a.s., Boulogne-Billancourt (FR)

(72) Inventors: Franck Li, Athis-Mons (FR); Philippe Bonnifait, La Croix Saint Ouen (FR); Javier Ibanez-Guzman, Raizeux (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 20 days.

(21) Appl. No.: 16/967,001

(22) PCT Filed: Feb. 12, 2019

(86) PCT No.: PCT/EP2019/053459
§ 371 (c)(1),
(2) Date: Aug. 3, 2020

(87) PCT Pub. No.: WO2019/166221
PCT Pub. Date: Sep. 6, 2019

(65) Prior Publication Data
US 2021/0041248 A1      Feb. 11, 2021

(30) Foreign Application Priority Data
Feb. 27, 2018   (FR) ...................... 18 51705

(51) Int. Cl.
*G01C 21/30*  (2006.01)
*G01S 19/45*  (2010.01)
(Continued)

(52) U.S. Cl.
CPC .............. *G01C 21/30* (2013.01); *G01S 19/45* (2013.01); *G06F 16/29* (2019.01); *G05D 1/0274* (2013.01); *G05D 1/0278* (2013.01)

(58) Field of Classification Search
None
See application file for complete search history.

(56) References Cited

U.S. PATENT DOCUMENTS 10,481,277 B2 *  11/2019  Schmid ................... G01S 19/48
10,495,464 B2 *  12/2019  Irish ...................... G01C 21/005
(Continued)

FOREIGN PATENT DOCUMENTS

DE      102013217060 A1 *  3/2015  ............. G01C 21/30
WO      WO 02/39063 A1       5/2002
WO      WO 2015/126499 A2    8/2015

OTHER PUBLICATIONS

International Search Report issued on May 6, 2019 in PCT/EP2019/053459 filed on Feb. 12, 2019, 2 pages.
(Continued)

*Primary Examiner* — Aniss Chad
*Assistant Examiner* — Mahmoud M Kazimi
(74) *Attorney, Agent, or Firm* — Oblon, McClelland, Maier & Neustadt, L.L.P.

(57) ABSTRACT

A method for estimating a precise position of a vehicle on a map includes acquiring at least one geolocated position of the vehicle by way of a geolocation system, pre-positioning the vehicle on the map, and particle filtering in which possible positions of the vehicle, called particles are processed. The particle filtering includes distributing particles on the map, and then updating the particles on the map, calculating the likelihood of each particle, selecting a limited set of particles, and, if an indicator relating to the likelihood of the selected particles and to the number of selected particles drops below a threshold, resampling particles on the map.

20 Claims, 3 Drawing Sheets

(51) Int. Cl.
  *G05D 1/00*   (2024.01)
  *G06F 16/29*   (2019.01)

(56) References Cited

U.S. PATENT DOCUMENTS

| | | |
|---|---|---|
| 10,907,972 B2 * | 2/2021 | Natroshvili ........ G01C 21/3446 |
| 2013/0346423 A1 * | 12/2013 | MacGougan .......... G01C 21/30 |
| | | 707/748 |
| 2016/0290805 A1 | 10/2016 | Irish et al. |
| 2017/0052031 A1 | 2/2017 | MacGougan et al. |
| 2017/0176189 A1 * | 6/2017 | D'Aquila ................ G06F 16/29 |
| 2020/0133303 A1 * | 4/2020 | Sakaguchi ......... G01C 21/3896 |

OTHER PUBLICATIONS

French Preliminary Search Report with Translation of Categories issued on Nov. 12, 2018 in French Application No. 1851705 filed on Feb. 27, 2018.

* cited by examiner

METHOD FOR ESTIMATING THE POSITION OF A VEHICLE ON A MAP

The present invention relates in general to the field of mapping.

It relates more particularly to a method for estimating a precise position of a vehicle on a map, comprising:
- a step of acquiring at least one geolocated position of the vehicle by way of a geolocation system,
- a step of pre-positioning the vehicle on the map, at its geolocated position, and
- a particle filtering step in which possible positions of the vehicle, called particles, are processed so as to determine the precise position of the vehicle on the map.

It also relates to a vehicle comprising:
- means for storing a map,
- a geolocation system, and
- a computer designed to pre-position the vehicle on the map.

TECHNOLOGICAL BACKGROUND

In order to ensure the safety of autonomous vehicles and partially automated vehicles, it is necessary to have extensive knowledge of the surroundings in which these vehicles are moving.

In practice, a vehicle perceives its surroundings in two different ways, namely:
- using a map and a geolocation system of the vehicle, and
- using exteroceptive sensors (cameras, radar or lidar sensor, etc.).

Companies that develop maps are currently working on what are called "high-definition" maps that make it possible to obtain highly detailed information about the features of the road network (lane widths, ground markings, signposts, etc.).

These maps are embedded in vehicles that are equipped with geolocation systems, thereby allowing these vehicles to locate themselves on the map at an estimated position in terms of longitude and latitude.

It has unfortunately been observed that this position is not always highly precise and reliable, which then results in the vehicle being located outside of the route that it is actually taking. This problem may prove to be particularly dangerous in the case of an autonomous vehicle that uses this information to guide itself.

In order to overcome this problem, one solution known from document DE102013217060 consists in taking into account information from exteroceptive sensors of the vehicle in order to adjust the position of the vehicle on the map.

This solution uses what is called a "particle filter" method. In this method, particles corresponding to the probable positions of the vehicle are contemplated and processed so as to attempt to find the precise position of the vehicle. In the abovementioned document, the particles are gradually selected by this filter as a function of the positions of the lane markings observed by the cameras on board the vehicle, until just one single particle probably corresponding to the actual position of the vehicle is found.

This solution exhibits two drawbacks.

Its first drawback is that its reliability depends very strongly on the visibility of the road markings. Specifically, it is understood that, in the absence of visibility or in the absence of road markings, it gives unreliable results.

Its second drawback is that it makes it possible to select in fine just one single particle, and so if it makes a mistake, the motor vehicle is not able to ascertain this, which may prove to be very dangerous.

SUBJECT OF THE INVENTION

In order to overcome the abovementioned drawbacks of the prior art, the present invention proposes a novel method for determining whether or not it is possible to ascertain the precise position of a motor vehicle on a map and, if it is, what this precise position is.

More particularly, what is proposed according to the invention is a method as defined in the introduction, wherein the particle filtering step comprises:
- a preliminary step of distributing particles on the map, as a function of the geolocated position of the vehicle on the map, and then a step of updating the particles on the map,
- a step of calculating the likelihood of each particle based at least on data from the map,
- a step of selecting a limited set of particles, and
- if an indicator relating to the likelihood of the selected particles and to the number of selected particles drops below a threshold, a step of resampling particles on the map.

Thus, by virtue of the invention, the likelihood of each particle is calculated based on data from the map. This calculation may therefore be independent of the data read by the exteroceptive sensors of the vehicle. It may therefore be independent of the visibility of the ground markings and of the visibility of the surroundings of the vehicle. It thus provides results whose reliability does not depend on external conditions.

Also by virtue of the invention, the resampling step is not performed automatically, thereby avoiding depletion of the particles, which could potentially lead to the elimination of a correct particle.

Other advantageous and non-limiting features of the method according to the invention are as follows:
- the likelihood of each particle is calculated as a function only of data from the map;
- the likelihood of each particle is calculated as a function also of data from sensors allowing the vehicle to perceive its surroundings, on the condition that these data are deemed to be reliable;
- in the particle filtering step, the precise position is chosen from among the limited set of selected particles as a function of the likelihood of each particle;
- with the map storing data relating to road sections, the likelihood of each particle is calculated as a function of the position of the closest road section with respect to the particle;
- in the preliminary step, the particles are distributed in a disk centered on the geolocated position of the vehicle;
- the radius of the disk is determined as a function of the horizontal protection level assigned to the geolocated position of the vehicle;
- in the selection step, the particles are selected as a function of the distance between them and the geolocated position of the vehicle;
- in the update step, the particles are moved on the map as a function only of information relating to the dynamics of the vehicle;
- in the resampling step, the particles are resampled using a low-variance technique.

The invention also relates to a vehicle comprising: means for storing a map,
a geolocation system, and
a computer designed to implement a method for estimating a precise position of the vehicle on the map as mentioned above.

DETAILED DESCRIPTION OF ONE EXEMPLARY EMBODIMENT

The following description with reference to the appended drawings, which are given by way of non-limiting example, will provide an understanding of the content of the invention and how it is able to be implemented.

Figure 2:
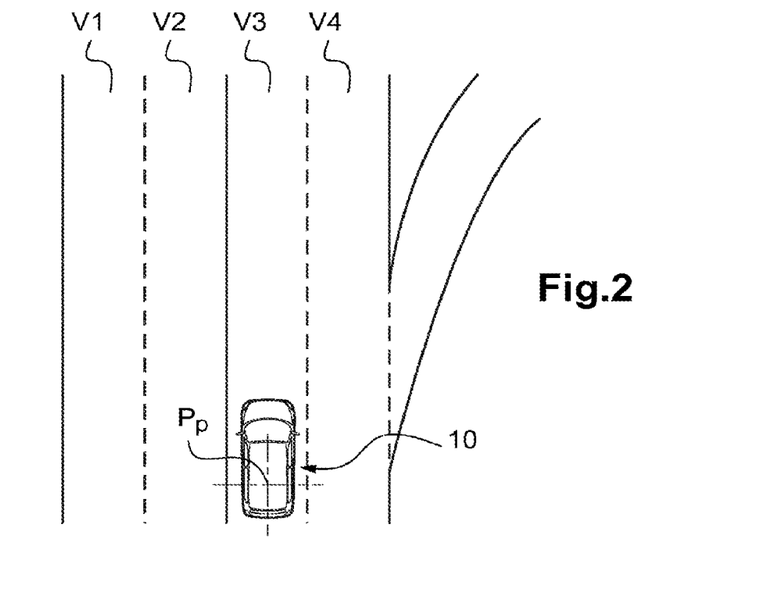
FIG. 2 is a plan view of a vehicle traveling on a road.

In the appended drawings:

FIG. 2 shows a motor vehicle 10 in the form of an automobile traveling on a road portion with four traffic lanes V1, V2, V3, V4.

In the remainder of the description, what will be more particularly of interest is the location of this motor vehicle 10 on a map, but the invention will not be limited to such an example. It will thus in particular apply to the location of any land, sea, air or space vehicle on a map.

The motor vehicle 10 under consideration here conventionally comprises a chassis, a drive train, a steering system, a braking system and an electronic and/or computerized processing unit, hereinafter called computer.

The computer is connected to what are called "proprioceptive" sensors that make it possible to precisely measure the speed of the vehicle and the angular yaw velocity of the vehicle.

The computer is preferably also connected to what are called "exteroceptive" sensors that make it possible to perceive the immediate surroundings of the motor vehicle 10 (they may be cameras, radar sensors, lidar sensors, etc.).

The computer is moreover connected to a geolocation system that makes it possible to evaluate the geolocated position $P_0$ of the vehicle 10, defined here by a latitude and a longitude. This may be for example a GPS system.

It will be considered here that this geolocation system is moreover designed to transmit an item of data called "horizontal protection level HPL" to the computer. This item of data, which is well known to a person skilled in the art, corresponds to the uncertainty in the measurement of the geolocated position $P_0$. Its value varies for example as a function of the number of satellites from which the geolocation system receives data, the quality of the reception of the signals, the quality of the geolocation system that is used, etc.

Following the same line of thought, it will also be considered here that this geolocation system is designed to transmit a covariance matrix relating to this same uncertainty to the computer.

The motor vehicle 10 under consideration could be semi-automated, such that its computer is able for example to trigger emergency braking when the driver has not noticed a hazard and has not exerted an appropriate action himself.

However, in the remainder of this disclosure, it will be considered that the motor vehicle 10 is autonomous and that the computer is designed to control the drive train, the steering system and the braking system of the vehicle.

The computer then comprises a computerized memory that records data used in the context of the autonomous control of the vehicle, and in particular in the context of the method described below.

It stores in particular a computerized application, consisting of computer programs comprising instructions whose execution by a processor allows the computer to implement the method described below.

It also stores what is called a "high-definition" topographical map.

This map stores a large amount of data.

It first of all comprises information relating to the topography of the roads. This topography is in this case stored in the form of road sections (or "links"). Each road section is in this case defined as a portion of just one traffic lane of a road whose features are constant over the entire length thereof (shape of the ground markings identical along the road section, constant width of this road section, etc.).

The map also stores other data characterizing each road section, including the width of the traffic lane, the shape of the ground markings located on either side of the traffic lane, the position and the shape of each sign next to the road on the road section, the identifiers of the previous and following road sections, etc.

Figure 1:
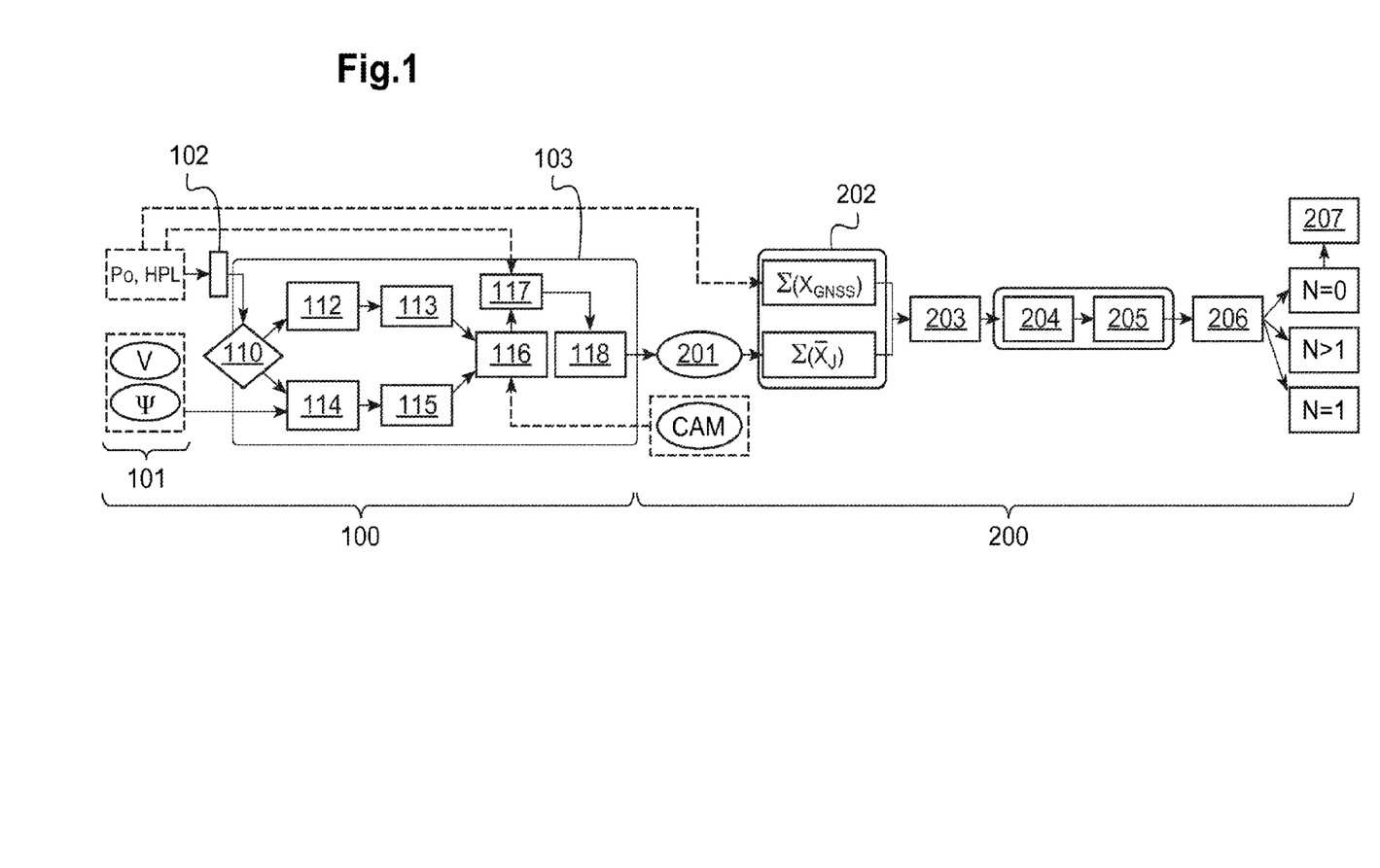
FIG. 1 is a diagram illustrating the various steps of a method according to the invention.

The method implemented by the computer in order to estimate the precise position $P_p$ of the motor vehicle 10 on the map comprises two major operations, namely a particle filtering operation 100 and a scenario selection operation 200 (see FIG. 1).

The scenario selection operation 200 uses the results of the particle filtering operation 100, meaning that it is implemented thereafter.

We may then start by describing the first particle filtering operation 100.

This operation is implemented recursively, that is to say in a loop and at regular time increments.

It comprises three main steps.

The first step 101 consists, for the computer, in acquiring various data via the sensors to which it is connected.

The computer thus acquires the geolocated position $P_0$ of the motor vehicle 10 and the horizontal protection level HPL that is associated therewith. These data are acquired by virtue of the geolocation system, which provides a latitude, a longitude and a horizontal protection level HPL.

The computer also acquires data relating to the dynamics of the motor vehicle 10. It thus acquires the speed V of the vehicle and its angular yaw velocity T.

The second step 102 is a step of pre-positioning the vehicle 10 on the map, at the acquired geolocated position $P_0$.

The third step 103 is a particle filtering step in which possible positions of the vehicle (or more precisely possible postures of the vehicle), called particles $P_i$, are processed in order to determine the precise location $P_p$ of the vehicle 10 on the map (or more precisely the precise posture of the vehicle on the map).

Each particle $P_i$ may be defined by:
two coordinates $x_i$, $y_i$ for defining the position of the particle in a Cartesian reference frame (these coordinates are linked to the acquired longitude and latitude),
a yaw angle for defining the angle formed by the particle with respect to a given direction, such as North, and an identifier of the map with which the particle $P_i$ is associated.

Figure 3:
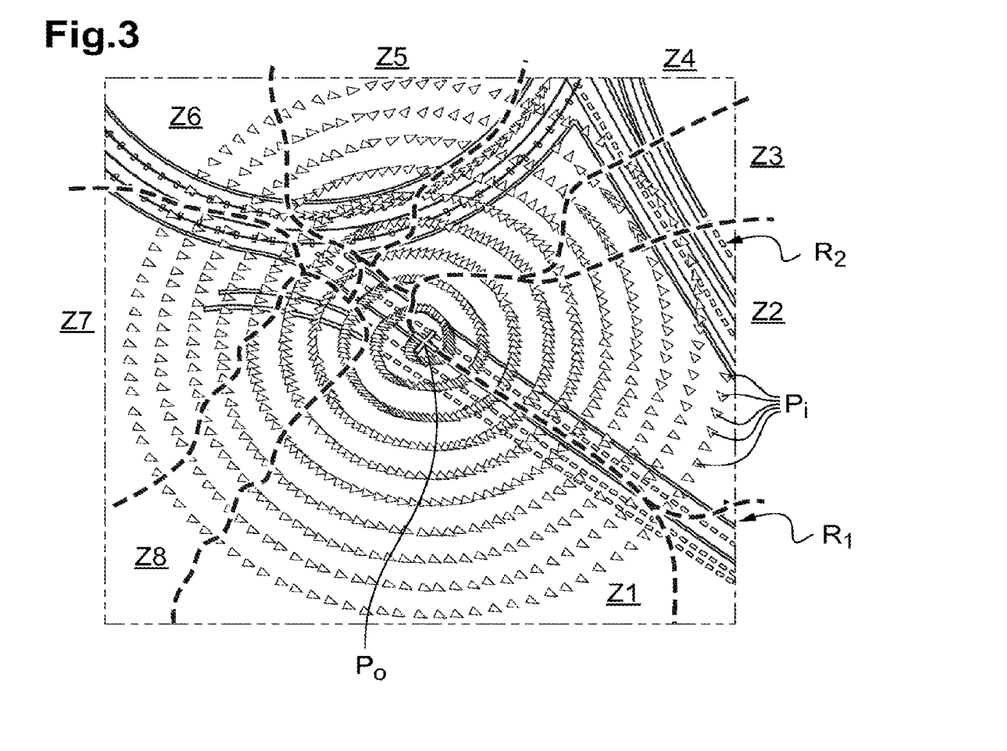
FIG. 3 is a schematic view of particles distributed on a map.
Figure 4:
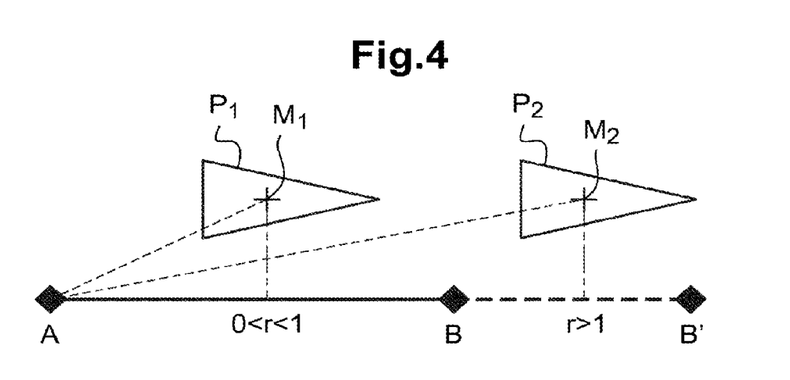
FIG. 4 is a schematic view of two particles located next to two successive road sections.
Figure 5:
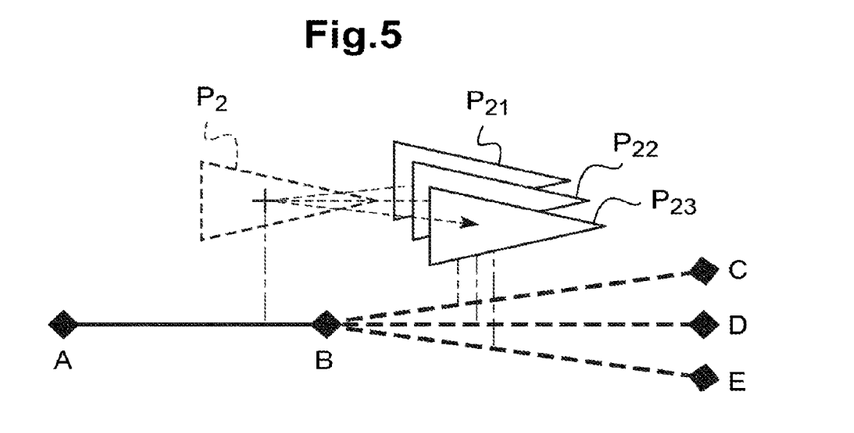
FIG. 5 is a schematic view of four particles located next to four road sections.

FIGS. 3 to 5 show particles $P_i$ in the form of isosceles triangles, each triangle having a center $M_i$ that corresponds to the position of the particle on the map, and an orientation that corresponds to the yaw angle of the particle on the map.

As shown in FIG. 1, the third particle filtering step 103 more precisely consists of a plurality of substeps that may now be described in more detail.

The first substep 110 consists in determining whether or not an initialization phase of the particle filter is present, this for example being the case when the motor vehicle 10 is started.

This situation may be taken as a starting scenario, in which case no particle has yet been generated.

The following substep 112 then consists in creating and distributing particles $P_i$ on the map, given the geolocated position $P_0$ of the vehicle 10.

To this end, the particles $P_i$ are distributed within a disk centered on the geolocated position $P_0$ of the vehicle 10, the radius of which disk is in this case equal to the horizontal protection level HPL.

They are more precisely distributed in a spiral, with a constant angular offset. The features of the spiral and the angular offset between the particles $P_i$ are chosen as a function of the number of particles $P_i$ that it is desired to generate.

This number is greater than 100, and preferably of the order of 1000. It is determined in such a way as to obtain sufficient precision without otherwise overburdening the computer.

At this juncture, the particles $P_i$ are not yet oriented.

Each particle $P_i$ thus corresponds to a possible position that the vehicle could have, given the error affecting the geolocation system.

Some particles, as may be seen in FIG. 3, are located off the road. This illustrates the fact that the particles are not constricted to the map and that they may move in a two-dimensional space. The filter is therefore highly flexible and makes it possible to initially contemplate a very large number of different solutions, the most unfeasible ones of which will then be eliminated by the particle filter.

In a following substep 113, the computer associates each particle $P_i$ with its closest road section.

The method chosen here is the point-to-curve method. This consists in associating each particle $P_i$ with the road section that is closest in terms of the Euclidean distance.

By way of illustrative example, it is thus seen in FIG. 4 that the particle $P_1$ is associated with the road section AB.

At this juncture, the computer may orient the particles $P_i$ as a function in particular of the orientation of the road section with which each particle is associated (and possibly also as a function of the dynamics of the vehicle).

The method then continues with a substep 116 that will be described further on.

As has been described above, the first substep 110 consisted in determining whether or not an initialization phase of the particle filter was present.

It is now possible to contemplate that this is not the case and that the process has already been initialized beforehand.

In this case, in a substep 114, the computer updates the particles $P_i$ on the map.

To this end, the particles $P_i$ are all moved on the map as a function of information relating to the dynamics of the vehicle.

The two items of data, i.e. the speed V of the vehicle and the angular yaw velocity W of the motor vehicle 10, are specifically used to move all of the particles $P_i$ by a given distance and to reorient the particles by a given angle.

It will be noted that this substep this time does not use the geolocated position $P_0$ of the motor vehicle.

In a following substep 115, the computer re-associates each particle $P_i$ with a road section.

More precisely, it determines which particles $P_i$ have to be associated with a new road section, and it identifies this new road section.

In order to understand how the computer works, reference may be made to FIG. 4 in which two particles $P_1$, $P_2$ centered on points M1, M2 are shown and in which a road section AB is also shown.

It is considered in this case that, at the previous time increment, the two particles $P_1$, $P_2$ were associated with just one and the same road section AB, since they were moved in substep 114.

The computer then determines a ratio r for each particle $P_i$ in order to ascertain whether or not each particle should be associated with a new road section.

This ratio r is calculated using the following formula:

$$r = \frac{(\vec{AB} \cdot \vec{AM_i})}{\|\vec{AB}\|^2}$$

If this ratio r is between 0 and 1, the association of the particle $P_i$ with its original road section should not be changed. This is the case here for the particle $P_1$.

If this ratio is negative, the association of the particle $P_i$ with its road section should be changed. This particle should more precisely be associated with the previous road section or with one of the previous road sections.

If this ratio is strictly greater than 1, the association of the particle $P_i$ with its road section should be changed. This particle should more precisely be associated with the following road section or with one of the following road sections.

Many situations may thus be encountered.

In the situation in FIG. 4 in which the road section AB has just one successor BB', the particle $P_2$ is associated with this successor (as long as the ratio r is between 0 and 1 with this new road section, otherwise another successor is contemplated).

In the situation in FIG. 5 in which the road section AB has multiple successors BC, BD, BE, the particle $P_2$ under consideration at the previous time increment is cloned into as many particles $P_{21}$, $P_{22}$, $P_{23}$ as there are successors BC, BD, BE.

There may also be provision to clone the particle fewer times if some of the successors may not be contemplated, given the dynamics of the vehicle.

In another situation that is not shown in the figures, it is possible that the particle has to be associated with another road section parallel to the road section with which it was associated at the previous time increment (which will occur in particular when the vehicle laterally changes traffic lane, for example in order to overtake another vehicle). This is made possible since the particles are not constricted to moving only over the same road section. This situation may be detected given the new position of the particle and the data stored in the map (ground marking information, traffic lane widths, etc.). In one variant, it is possible to contemplate this situation being detected also using cameras on board the vehicle.

In a substep 116 that follows both substep 115 and substep 113, the computer calculates the likelihood $w_i$ of each particle $P_i$.

The likelihood of a particle is expressed here by its weight $w_i$. The greater the weight of a particle, the more likely it is that the particle under consideration corresponds to the exact position of the motor vehicle 10.

This weight may be calculated in various ways.

In a first embodiment, the weight $w_i$ of each particle $P_i$ is calculated as a function only of data from the map.

More precisely, it is determined as a function of the Euclidean distance between the particle under consideration and the road section with which it is associated (this weight is for example inversely equal to this distance).

In a second embodiment, the weight $w_i$ of each particle $P_i$ is calculated as a function also of data from the exteroceptive sensors, on the condition that these data are deemed to be reliable.

It is specifically possible to imagine increasing or reducing the weight of the particle under consideration as a function of the lateral information from the cameras CAM of the vehicle. These cameras are effectively capable of detecting ground marking lines and of feeding them back to the computer in the form of a polynomial model. The computer may then verify whether the shape of these lines corresponds to that of the ground markings recorded in the map, and adjust the weight of the particle accordingly.

It may be noted that the ground markings are not always detected by the cameras. This may be due to conditions that are difficult for the sensors, such as for example poor lighting, a wet road, erased markings, etc. In these specific cases, the camera indicates a low confidence level to the computer and the calculation of the weight is then based only on the data provided by the map, as described in the first embodiment.

It will be observed here that the reliability criterion of an item of data is generally provided by the sensor that measures the item of data, for example in the form of a percentage (which percentage will then be used to determine whether or not the item of data should be taken into account).

Regardless of the method that is used, the method continues with a substep 117 of selecting a limited set of particles $P_i$, so as to eliminate those that would be too far away from the instantaneous geolocated position $P_0$ of the motor vehicle 10.

In order to implement this substep, the computer acquires the new geolocated position $P_0$ of the motor vehicle 10, and it then calculates the distance between each particle $P_i$ and this instantaneous geolocated position $P_0$.

If this distance is greater than the horizontal protection level HPL, the weight $w_i$ of the corresponding particle $P_i$ is set to zero, which will thereby allow this particle to be automatically eliminated thereafter.

If not, the weight $w_i$ of the corresponding particle $P_i$ is not modified.

In a following substep 118, the computer determines whether or not it is necessary to resample particles $P_i$ on the map.

To this end, it uses an indicator $N_{eff}$, which is calculated as a function of the weight $w_i$ of the particles $P_i$ and of the number of particles $P_i$.

If this indicator $N_{eff}$ drops below a predetermined threshold (stored in the read-only memory of the computer), then the computer resamples the particles $P_i$ on the map. If not, the particles $P_i$ are kept in their state.

As is known, resampling consists in considering the particles (hereinafter called original particles) in their entirety, and in drawing new particles from this original set.

In order to resample the particles, the computer could use a conventional method in which it would randomly draw a predefined number of new particles from the original set of particles $P_i$, the probability of drawing each particle $P_i$ being proportional to the weight $w_i$ of this particle $P_i$. However, this method generally causes depletion of the particles, since it is always those that have a very high weight that are drawn.

In this case, the computer preferably rather uses what is called a "low-variance" resampling method. Specifically, this method promotes the maintenance of a good distribution of the particles on the map. This method consists in randomly drawing a predefined number of new particles from the original set of particles $P_i$, the probability of drawing each particle $P_i$ being a function of the weight $w_i$ of this particle $P_i$, but this time not being proportional to this weight.

At this juncture, the computer could make do with restarting substeps 114 to 118 in a loop until obtaining particles that are all located around one and the same point, which would be considered to correspond to the precise position $P_p$ of the motor vehicle 10 on the map.

This is however not the option that is chosen here. Thus, as has been explained above, once substep 118 is complete, a scenario selection operation 200 is provided.

This scenario selection operation 200 is implemented once the particle filtering operation 100 has converged and has given a limited number of solutions (the particles being for example grouped around a number of points lower than a predetermined threshold).

This scenario selection operation 200 is implemented recursively, that is to say in a loop and at regular time increments. It comprises several successive steps.

In a first step 201, the computer selects "scenarios".

To this end, it considers the particles $P_i$ in various sets within each of which the particles are all associated with one and the same traffic lane (or, as a variant, with one and the same road section).

The benefit of working on scenarios is that it will then be possible to select all of the most likely scenarios, which will thereby make it possible firstly to retain the correct scenario from those selected and secondly to verify the validity of each selected scenario.

The scenarios may be worded in the form of assertions such that "the vehicle is located in the traffic lane whose reference is . . . ".

In order to gain a good understanding of what a scenario corresponds to within the meaning of the present disclosure, FIG. 3 groups the particles together into eight sets $Z_1, Z_2, Z_3, Z_4, Z_5, Z_6, Z_7, Z_8$ each corresponding to a scenario.

By way of example, the particles in set $Z_1$ correspond to the scenario "the vehicle is located in the right-hand traffic lane of the road $R_1$".

The particles in set $Z_2$ correspond to the scenario "the vehicle is located in the left-hand traffic lane of the road $R_1$".

The particles in set $Z_3$ correspond to the scenario "the vehicle is located in the left-hand traffic lane of the road $R_2$".

The particles in set $Z_4$ correspond to the scenario "the vehicle is located on the roundabout between its junctions with roads $R_1$ and $R_2$", etc.

Considering that a number "J" of scenarios (in FIG. 3, J=8) are found, each scenario may also be expressed in the form of a vector $\overline{X}_J$ whose components correspond to the sum of the coordinates of the particles $P_i$ of this scenario, weighted by the weight $w_i$ of these particles.

The computer may assign a "confidence index" to each scenario, which confidence index is equal to the sum of the weights $w_i$ of the particles $P_i$ of this scenario.

In a second step 202, the computer will determine the covariance matrix $\Sigma^{-1}(\overline{X}_j)$ of each scenario and the covariance matrix $\Sigma^{-1}(X_{GNSS})$ of the geolocated position $P_0$ of the vehicle 10.

Manipulating such covariance matrices specifically makes it possible to characterize the uncertainty linked to each scenario and that linked to the geolocated position $P_0$ provided by the geolocation system.

As was explained above, the covariance matrix $\Sigma^{-1}(X_{GNSS})$ linked to the geolocated position $P_0$ of the vehicle 10 is in this case transmitted directly to the computer by the geolocation system. It is in this case a 2×2 matrix.

With regard to the covariance matrix $\Sigma^{-1}(\overline{X}_j)$ linked to each scenario, this is calculated as a function of the weights $w_i$ of all of the particles $P_i$ associated with this scenario. It is also in this case a 2×2 matrix.

It is then necessary to determine the extent to which each scenario is "coherent", given the geolocated position $P_0$ provided by the geolocation system and taking into account the error linked to the measurement of this geolocated position.

To this end, in a step 203, a mathematical object called the Mahalanobis distance $D_{Mj}$ is used, the expression for which is as follows:

$$D_{M_j}(\overline{X}_j) = \sqrt{(\overline{X}_j - X_{GNSS})^T \cdot [\Sigma^{-1}(\overline{X}_j) - \Sigma^{-1}(X_{GNSS})]}$$

where $X_{GNSS}$ corresponds to the vector "geolocated position $P_0$".

The Mahalanobis distance is specifically an object that makes it possible to evaluate the coherence between two uncertain situations, taking into account the covariances of the variables (that is to say the doubt linked to each variable).

Then, in a step 204, there is provision to select a first limited (or even empty) set of scenarios from among the scenarios acquired in step 201.

To this end, a Chi-square ($X^2$) test is performed for each Mahalanobis distance $D_{Mj}$.

In practice, each Mahalanobis distance $D_{Mj}$ is compared here with a critical threshold in order to determine whether or not the scenario under consideration is coherent with the geolocated position $P_0$.

If the scenario under consideration and the geolocated position $P_0$ are coherent within the meaning of the Chi-square test, the scenario is retained.

By contrast, if the scenario under consideration and the geolocated position $P_0$ are not coherent within the meaning of the Chi-square test, the scenario is rejected.

It will be noted here that, if a scenario is retained, this does not necessarily mean that this scenario is true. Specifically, at this juncture, several scenarios may be retained.

By contrast, if a scenario is rejected, this does not necessarily mean that this scenario was false.

Specifically, it may be the case that a large error affects the measurement of the geolocated position $P_0$. In this case, a true scenario may be rejected. As will become clearly apparent in the remainder of this disclosure, this will not otherwise affect the reliability of the method proposed here.

In a subsequent step 205, there is provision to select a second limited (or even empty) set of scenarios from among the scenarios selected in step 204.

It will be noted here that this second selection could have been made before the first selection without otherwise affecting the progress of the method.

This second selection consists in retaining only the "likely" scenarios for which an indicator, linked to the weight $w_i$ of the particles $P_i$ that form this scenario, is greater than a determined threshold. The objective is specifically to eliminate scenarios that have met the Chi-square coherence test but that are unlikely.

To this end, the computer eliminates the scenarios for which the confidence index (which it is recalled is equal to the sum of the weights $w_i$ of the particles $P_i$ of the scenario under consideration) is lower than a determined threshold. This threshold is in this case invariable and stored in the read-only memory of the computer.

At the end of these two scenario selection steps, the computer has retained a number N of scenarios that are not only coherent but also likely.

In a step 206, there is then provision to determine the usable or non-usable nature of each selected scenario, as a function of this number N.

Three cases may be contemplated.

The first case is the one in which the number N is equal to 1. In this case, since just one scenario has been retained, this scenario is considered to be reasonable and able to be used to generate a driving instruction for the autonomous vehicle. The computer is therefore able to trust it. In this case, the computer may then consider that the highest-weight particle of this scenario corresponds to the precise position $P_p$ of the vehicle 10.

The second case is the one in which the number N is strictly greater than 1. In this case, since several scenarios have been retained, none of them are considered to be able to be used to generate a driving instruction for the autonomous vehicle. The method is therefore restarted in a loop until just one single scenario is obtained.

The last case is the one in which the number N is equal to 0. In this case, since no scenario has been retained, no particle is considered to be able to be used to generate a driving instruction for the autonomous vehicle. Moreover, the computer may advantageously deduce from this situation that there is an incoherence between the measurements performed by the geolocation system and the acquired scenarios, this probably being due to a problem affecting the geolocation system. In this case, there is provision for a step 207 of transmitting an alert to the driver and/or to the control unit of the vehicle in autonomous mode, such that same is able to take the necessary measures (emergency stop, control in degraded mode, etc.).

The invention claimed is:

1. A method for estimating a precise position of a vehicle on a map, comprising:
    acquiring at least one geolocated position of the vehicle via a geolocation system;
    pre-positioning the vehicle on the map, at the geolocated position of the vehicle; and
    particle filtering, via a computer of the vehicle, in which possible positions of the vehicle, called particles, are processed so as to determine the precise position of the vehicle on the map,
    wherein the particle filtering comprises:
    distributing particles on the map as a function of the geolocated position of the vehicle on the map, the particles being arranged in spiral extending outward from the geolocated position of the vehicle at a constant angular offset, and then updating the particles on the map, calculating a likelihood of each particle being the precise position of the vehicle based at least on data from the map, selecting a limited set of particles, and starting a resampling of the particles on the map in response to an indicator dropping below a threshold such that the resampling does not occur while the indicator is above the threshold, the indicator relating to the likelihood of the selected particles being the precise position of the vehicle and to the number of selected particles.

2. The estimation method as claimed in claim 1, wherein the likelihood of each particle is calculated as a function only of data from the map.

3. The estimation method as claimed in claim 1, wherein the likelihood of each particle is calculated as a function of data from sensors allowing the vehicle to perceive its surroundings, on the condition that these data are deemed to be reliable.

4. The estimation method as claimed in claim 1, wherein the particle filtering includes choosing the precise position from among the limited set of selected particles as a function of the likelihood of each particle.

5. The estimation method as claimed in claim 1, wherein, with the map storing data relating to road sections, the likelihood of each particle is calculated as a function of the position of the closest road section with respect to the particle.

6. The estimation method as claimed in claim 1, wherein the distributing particles on the map includes distributing the particles in a disk centered on the geolocated position of the vehicle.

7. The estimation method as claimed in claim 6, wherein a radius of the disk is determined as a function of a horizontal protection level assigned to the geolocated position of the vehicle.

8. The estimation method as claimed in claim 1, wherein the selecting includes selecting the particles as a function of a distance between them and the geolocated position of the vehicle.

9. The estimation method as claimed in claim 1, wherein the updating includes moving the particles on the map as a function only of information relating to dynamics of the vehicle.

10. The estimation method as claimed in claim 1, wherein the resampling includes resampling the particles using a low-variance technique.

11. The estimation method as claimed in claim 1, wherein, when the indicator is not below the threshold, the resampling is not performed.

12. The estimation method as claimed in claim 1, wherein the threshold is stored in a read-only memory of the computer.

13. The estimation method as claimed in claim 1, wherein a plurality of the particles distributed on the map are not distributed on any road section on the map.

14. The estimation method as claimed in claim 13, wherein all of the particles distributed on the map are associated with at least one of the road sections on the map.

15. The estimation method as claimed in claim 14, wherein the distributing includes, after the particles are associated with at least one of the road sections, orienting each of the particles as function of an orientation of the associated road section.

16. The estimation method as claimed in claim 14, wherein the updating the particles on the map includes, for each of the particles, calculating a ratio r to determine if each particle should be moved to new road section using the following formula:

$$r = \frac{\left(\vec{AB} \cdot \vec{AM_i}\right)}{\|\vec{AB}\|^2}$$

with AB being a length of the road section for the associated with the particle and AM being a length from a beginning of the road section to a center of the particle, wherein when the ratio r is between 0 and 1, the association of the particle with and the road section should not be changed, and wherein when the ratio r is strictly greater than 1, the particle is associated with a following road section.

17. The estimation method as claimed in claim 1, wherein all of the particles distributed on the map are associated with at least one of the road sections on the map.

18. The estimation method as claimed in claim 17, wherein the distributing includes, after the particles are associated with at least one of the road sections, orienting each of the particles as function of an orientation of the associated road section.

19. The estimation method as claimed in claim 17, wherein the updating the particles on the map includes, for each of the particles, calculating a ratio r to determine if each particle should be moved to new road section using the following formula:

$$r = \frac{\left(\vec{AB} \cdot \vec{AM_i}\right)}{\|\vec{AB}\|^2}$$

with AB being a length of the road section for the associated with the particle and AM being a length from a beginning of the road section to a center of the particle, wherein when the ratio r is between 0 and 1, the association of the particle with and the road section should not be changed, and wherein when the ratio r is strictly greater than 1, the particle is associated with a following road section.

20. A vehicle comprising:

a map;

a geolocation system; and a computer configured to pre-position the vehicle on the map, wherein the computer is configured to:

acquire at least one geolocated position of the vehicle via the geolocation system;

pre-position the vehicle on the map, at the geolocated position of the vehicle; and particle filter in which possible positions of the vehicle, called particles, are processed so as to determine the precise position of the vehicle on the map, wherein the particle filtering comprises:

distributing particles on the map as a function of the geolocated position of the vehicle on the map, the particles being arranged in spiral extending outward from the geolocated position of the vehicle at a constant angular offset, and then updating the particles on the map, calculating a likelihood of each particle being the precise position of the vehicle based at least on data from the map, selecting a limited set of particles, and starting a resampling of the particles on the map in response to an indicator dropping below a threshold such that the resampling does not occur while the indicator is above the threshold, the indicator relating to the likelihood of the selected particles being the precise position of the vehicle and to the number of selected particles.

* * * * *